United States Patent [19]

Welzen et al.

[11] Patent Number: 4,783,653
[45] Date of Patent: Nov. 8, 1988

[54] LOW DRIVE VOLTAGE DISPLAY DEVICE

[75] Inventors: Theodorus L. Welzen; Adrianus J.S.M. De Vaan, both of Heerlen, Netherlands

[73] Assignee: U.S. Philips Corporation, New York, N.Y.

[21] Appl. No.: 921,927

[22] Filed: Oct. 20, 1986

[30] Foreign Application Priority Data

Nov. 4, 1985 [NL] Netherlands ............. 8503007

[51] Int. Cl.⁴ ................................ G09G 3/36
[52] U.S. Cl. ........................ 340/805; 340/784
[58] Field of Search ......... 340/784, 805, 811, 812; 350/332, 333

[56] References Cited

U.S. PATENT DOCUMENTS

| | | | |
|---|---|---|---|
| 4,231,035 | 10/1980 | van Doorn et al. | 340/784 |
| 4,370,647 | 1/1983 | Brantingham | 340/784 |
| 4,404,555 | 9/1983 | Long et al. | 340/811 |
| 4,591,849 | 3/1986 | Hughes et al. | 340/811 |

Primary Examiner—Gerald L. Brigance
Attorney, Agent, or Firm—Bernard Franzblau

[57] ABSTRACT

In a low drive voltage display device having a matrix structure, the number of rows to be addressed is selected to be smaller than is possible on the ground of threshold steepness. The required selection voltages can then be selected to be considerably lower than the voltages in accordance with the Alt & Pleshko addressing scheme.

3 Claims, 2 Drawing Sheets

LOW DRIVE VOLTAGE DISPLAY DEVICE

BACKGROUND OF THE INVENTION

This invention relates to a display device comprising two support plates spaced at a defined distance from each other and having surfaces facing each other between which a layer of liquid crystal material is provided. A pattern of N row electrodes are provided on one surface and a pattern of column electrodes are provided on the other surface with said row electrodes crossing the column electrodes and the crossover regions constituting a matrix of display cells which can be switched from a first condition to a second condition optically different therefrom by means of a row-scanning circuit periodically scanning the row electrodes with a row selection pulse of the magnitude $V_s$. A column selection circuit applies data voltages of the magnitude $\pm V_d$ to the column electrodes during a period when a row electrode is scanned such that the optical condition realized in a display cell is determined by the RMS-voltage value across the relevant cell. The RMS voltage value for the selected display cells, i.e. the display cells in the on-condition, is given by:

$$V_1 = \left[ \frac{(V_s + V_d)^2}{N} + \frac{(N-1)}{N} V_d^2 \right]^{\frac{1}{2}}$$

and for the non-selected display cells, i.e. the display cells in the off-condition, being given by:

$$V_2 = \left[ \frac{(V_s - V_d)^2}{N} + \frac{(N-1)}{N} V_d^2 \right]^{\frac{1}{2}}$$

wherein the ratio V1/V2 in the transmission voltage characteristic curve of the optical effect associated with the liquid crystal material is of such a nature that not more than $N_{max}$ row electrodes can be used for a selected contrast ratio between selected and non-selected display cells in accordance with the Alt & Pleshko-RMS multiplex drive mode.

The RMS multiplex drive mode as described by Alt & Pleshko in IEEE Trans. El Dev., Vol., ED 21, 1974, pages 146–153 is applied as the most commonly used mode for liquid crystal display devices. Alt & Pleshko have derived relations which for a given value of the ratio S=V1/V2 (also referred to as threshold slope in the transmission voltage characteristic curve) indicate the maximum number of rows $N_{max}$ that can be driven by using this mode while maintaining a predetermined contrast and the way in which the voltage $V_s$ of the row selection pulse and the data voltages of the magnitude $\pm V_d$ must be chosen to realize this. These relations are as follows:

$$N_{max} = \left[ \frac{s^2 + 1}{s^2 - 1} \right]^2 \quad (1)$$

$$V_s/V_d = \sqrt{N_{max}} \quad (2)$$

$$V_d = V_2 \left[ \frac{\frac{1}{2} N_{max}}{N_{max} - \sqrt{N_{max}}} \right]^{\frac{1}{2}} \quad (3)$$

If the row-selection voltage $V_s$ and the data voltage $V_d$ are selected in accordance with the equations (2) and (3), the resultant RMS voltage across a selected picture element will be equal to $V_1$ when using $N_{max}$ rows and the voltage across a non-selected element will be equal to $V_2$. A higher multiplex ratio, in other words a higher value for $N_{max}$ requires a steeper slope in the transmission voltage characteristic curve, i.e. a value of the magnitude S=V1/V2 closer to 1.

When the multiplex ratio increases, ever higher voltages are required when the drive according to Alt & Pleshko is used. For a multiplex ratio of approximately 1:100 and more and a value of $V_2$ of (typically) 2 Volts, this leads to, for example, a row selection voltage $V_s$ of the order of 16 Volts or more which is undesirable, inter alia, in connection with the availability of integrated drive circuits.

SUMMARY OF THE INVENTION

It is an object of the invention to provide a display device in which for a given high multiplex ratio (for example, higher than 100:1) the drive of a liquid crystal display is effected in accordance with the RMS multiplex drives with row selection voltages which are lower than those prescribed by the Alt & Pleshko-relations, without detracting from the contrast.

To this end a display device of the type described in the opening paragraph according to the invention is characterized in that for $N<N_{max}$ the voltage ratio Vs/Vd is defined by the relation:

$$\sqrt{N_{max}} \left[ 1 - \sqrt{1 - N/N_{max}} \right] \leq \frac{V_s}{V_d} < \sqrt{N}$$

in which for $V_2$ the RMS-voltage value is selected which corresponds to the off-condition of the display cell.

The invention is based on the recognition that for a selected $V_2$ at a number of N rows with $N<N_{max}$ multiplex drive can be used with a certain range of $V_s$ and $V_d$ values while maintaining the desired contrast. From this range of values row selection voltages can be chosen which are considerably lower than those in accordance with the Alt & Pleshko-relations.

BRIEF DESCRIPTION OF THE DRAWINGS

The invention will now be further described with reference to an embodiment shown in the accompanying drawing in which.

DESCRIPTION OF THE PREFERRED EMBODIMENTS

Figure 1:
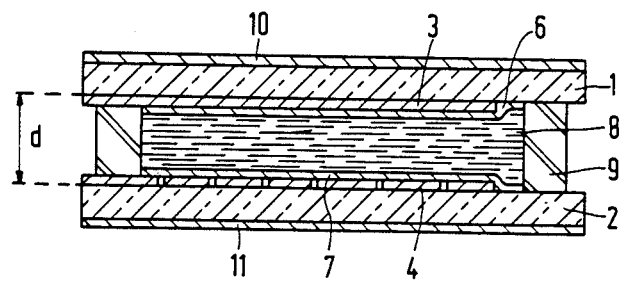
FIG. 1 diagrammatically shows a liquid crystal display device.

The liquid crystal display device shown in FIG. 1 has two glass supporting plates 1 and 2 which are provided with electrodes 3 and 4 consisting of indium-tin oxide. A silicon oxide layer is vapour-deposited on the surfaces of the supporting plates 1 and 2 provided with electrodes at an angle of 80°–86° to the normal on the surface. The layers constitute the orientation laters 6 and 7. A liquid crystal material 8 is present between the supporting plates. The distance d between the plates is maintained by spacers not shown in the drawing, which are regularly distributed over the plate surfaces. A sealing rim 9 connects the supporting plates at their circumference. The supporting plates are each provided with a linear polariser, more specifically a polariser 10 and an analyser 11.

Figure 2:
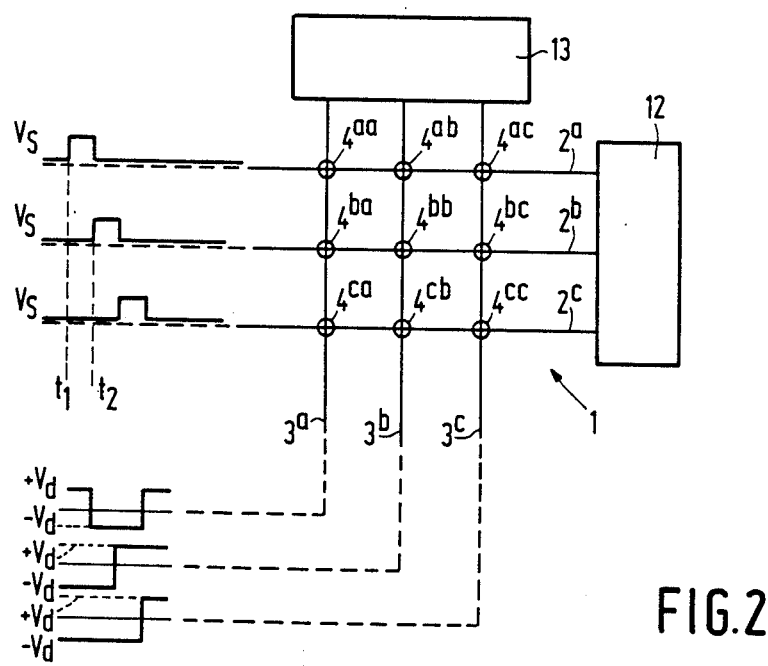
FIG. 2 diagrammatically shows part of a matrixoriented display device.
Figure 3:
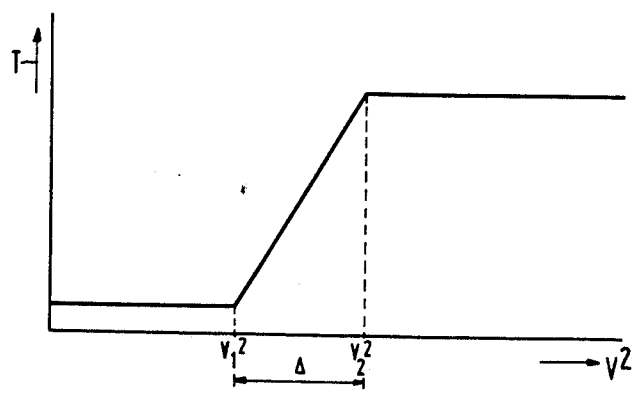
FIG. 3 shows the transmission voltage characteristic curve of a picture cell associated with this device.

FIG. 2 diagrammatically shows part of a matrixoriented display device 1 which is driven by a number of N selection rows (row electrodes) 2, while the information to be displayed is presented on the data rows (column electrodes) 3. Display elements 4 are provided at the crossover regions of the selection rows 2 and the data rows 3. The voltage transmission characteristic curve of these display elements is diagrammatically shown in FIG. 3. Dependent on the information presented on the data rows 3 the display elements 4 are either in an on or in an off-condition. The device includes a line scanning circuit 12 and a column selection circuit 13 for presenting selection and data voltages.

The information is presented, for example by way of pulses. Synchronously with the selection of the lines or row electrodes with the aid of a row selection voltage $V_s$ the picture information (data voltage $\pm V_d$) is applied via the column electrodes. From the instant $t_1$ the row $2^a$ is selected during a period $T_L$ (line period), which together with the information ($\pm V_d$) which is then present on the data rows $3^a$, $3^b$, $3^c$ determines the condition of the picture elements $4^{aa}$, $4^{ab}$, $4^{ac}$. From an instant $t_2$ the row $2^b$ is selected during a period $T_L$. The information ($\pm V_d$) then present on the data rows 3 determines the condition of the picture elements $4^{ba}$, $4^{bb}$, $4^{bc}$ etc. During the remaining part of a frame time $T_F = N.T_L$ a voltage $\pm V_d$ is present across the display cells 4 which voltage must be lower than the threshold voltage of the optical effect.

In practice both the rise time and the decay time of the optical effect is often much longer than the frame time. The means that the display element reacts to the cumulative effect of a number of drive pulses. Notably an LCD-display element reacts in the same manner as when it was driven with a sine or square-wave signal having the same RMS-value as that of the on and off-voltages $V_1$ and $V_2$ given by:

$$V_1 = \left[ \frac{(V_s + V_d)^2}{N} + \left( \frac{N-1}{N} \right) V_d^2 \right]^{\frac{1}{2}}$$

$$V_2 = \left[ \frac{(V_s - V_d)^2}{N} + \left( \frac{N-1}{N} \right) V_d^2 \right]^{\frac{1}{2}}$$

As described in the preamble, the maximum number of selection rows $N_{max}$ is related to the value of $V1/V2$, also referred to as the threshold slope of the optical effect.

According to the invention, if $N < N_{max}$, the selection voltage $V_s$ to be used may be considerably lower than that which has been derived by means of the Alt & Pleshkorelations, provided that the following relations are satisfied:

$$V_1^2 - V_2^2 \geq \Delta \text{ or} \quad (4)$$

$$\frac{(V_s + V_d)^2}{N} + \left( \frac{N-1}{N} \right) V_d^2 \geq V_2^2 + \Delta$$

$$\frac{(V_s - V_d)^2}{N} + \left( \frac{N-1}{N} \right) V_d^2 = V_2^2 \quad (5)$$

With $x^2 = \left( \frac{V_s}{V_d} \right)^2$ and $y^2 = \left( \frac{V_d}{V_2} \right)^2$ (4) and (5) may be rewritten as:

$$y^2(x+1)^2 + (N-1)y^2 \geq N \left( 1 + \frac{\Delta}{V_2^2} \right) \quad (6)$$

$$y^2(x-1)^2 + (N-1)y^2 = N \quad (7)$$

Elimination of $y^2$ from (6) and (7) results in:

$$\frac{(x+1)^2 + (N-1)}{(x-1)^2 + (N-1)} \geq 1 + \frac{\Delta}{V_2^2} \quad (8)$$

which with $$\gamma = 1 + \frac{\Delta}{V_2^2}$$

results in $$\frac{\gamma+1}{\gamma-1} \left( 1 - \sqrt{1 - \left( \frac{\gamma-1}{\gamma+1} \right)^2 N} \right) \leq x \leq \frac{\gamma+1}{\gamma-1} x \quad (9)$$

$$\left( 1 + \sqrt{1 - \left( \frac{\gamma-1}{\gamma+1} \right)^2 N} \right)$$

with the sub-requirement:

$$1 - \left( \frac{\gamma-1}{\gamma+1} \right)^2 N \geq 0$$

or

-continued $$N \leq \left(\frac{\gamma+1}{\gamma-1}\right)^2 = \frac{1+\Delta/V_2^2+1}{1+\Delta/V_2^2-1} = \frac{V_1^2+V_2^2}{V_1^2-V_2^2} = \frac{s^2+1}{s^2-1}$$

$$\left(\frac{s^2+1}{s^2-1}\right)$$

according to the Alt & Pleshko relations is equal $N_{max}$ or $$\left(\frac{\gamma+1}{\gamma-1}\right)^2 = N_{max}$$

and (9) can be rewritten as $$\sqrt{N_{max}}\left(1-\sqrt{1-\frac{N}{N_{max}}}\right) \leq \frac{V_s}{V_d} \leq \sqrt{N_{max}}\left(1+\sqrt{1-\frac{N}{N_{max}}}\right) \quad (10)$$

Equation (10) indicates the range of $V_s/V_d$ values which result in a $V_1$ value defined by:

$$V_1^2 \geq V_2^2 + \Delta \quad (11)$$

Figure 4:
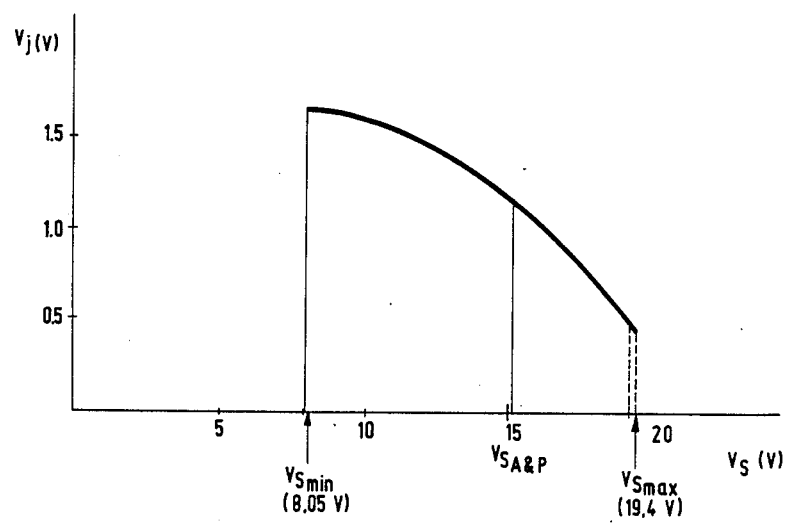
FIG. 4 shows the relation between selection and data voltages for such a display device driven with N selection rows, where N is less than the maximum N associated with the picture element.

The actual $V_s$ and $V_d$ values satisfying this can be found by combination of the equations (10) and (5). This is illustrated in FIG. 4 in which $N_{max}$ is assumed to be 256, N=128 and $V_2$=1.8 Volts. This Figure also shows which $V_s$ and $V_d$ values would be found for multiplexing 128 rows in accordance with the Alt & Pleshko multiplex drive mode.

Figures 5, 6:
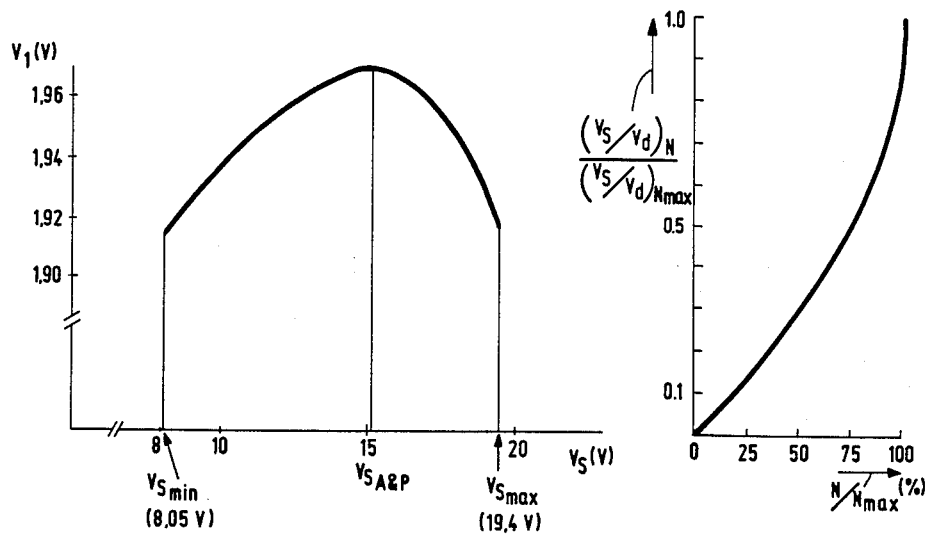
FIG. 5 shows the effective voltages across a picture element emanating therefrom.
FIG. 6 shows the minimum Vs/Vd value as a function of $$\frac{N}{N_{max}}.$$

It is clearly evident from the Figure that, dependent on the selected $V_d$ values, selection voltages which are lower then those determined by the Alt & Pleshko relations for $N_{max}$=128 ($V_s$=15.1 Volts) are possible. FIG. 5 diagrammatically shows how the effective RMS-voltage $V_1$ across a picture display element varies as a function of the selection voltage $V_s$ within the limits as defined in FIG. 4. The $V_s$ values selected in this Figure and the associated $V_d$ values give rise to the RMS voltage across the picture element, as is found with the left-hand member of the equation (4). The Figure shows that $V_1$ is of course at a maximum for $V_s$=15.1 Volts, in other words the selection voltage in accordance with Alt & Pleshko for $N_{max}$=128, but the device can also be operated without loss of contrast and at much lower voltages because $V_1$ in the example shown only needs to be higher than 1.91 Volts.

Equation (10) also shows the minimum $V_s/V_d$ ratio with which N rows can be multiplexed for an optical medium at a threshold slope $S=V_1/V_2$ such that in accordance with the Alt & Pleshko mode, a maximum of $N_{max}$ rows can be multiplexed, namely $$(V_s/V_d)_{min} = \sqrt{N_{max}}\left(1-\sqrt{1-N/N_{max}}\right) \quad (12)$$

In the Table below Vs/Vd and Vs/V2 values are given which are calculated in accordance with equation (12) for a number of electro-optical media having a different value for $S=V1/V2$ and hence a different $N_{max}$ value

| | medium 1 $s^2 = 1.286$ $N_{max} = 64$ | | medium 2 $s^2 = 1.194$ $N_{max} = 128$ | | medium 3 $s^2 = 1.133$ $N_{max} = 256$ | |
|---|---|---|---|---|---|---|
| N | Vs/Vd | Vs/V2 | Vs/Vd | Vs/V2 | Vs/Vd | Vs/V2 |
| 32 | 2.343 | 2.314 | 1.516 | 1.533 | 1.033 | 1.050 |
| 48 | 4 | 3.703 | 2.369 | 2.348 | | |
| 64 | 8 | 6.047 | 3.314 | 3.206 | 2.144 | 2.138 |
| 96 | | | 5.657 | 5.131 | 3.351 | 3.275 |
| 128 | | | 11.313 | 8.379 | 4.686 | 4.472 |
| 192 | | | | | 8 | 7.155 |
| 256 | | | | | 16 | 11.687 |

It is evident from this Table and FIG. 4 that in practice where a low Vs/Vd ratio is desired the relevant range is determined by $$\sqrt{N_{max}}\left(1-\sqrt{1-\frac{N}{N_{max}}}\right) \leq \frac{V_s}{V_d} < \sqrt{N}$$

The term $\sqrt{N_{max}}$ in equation (12) corresponds to Vs/Vd according to Alt & Pleshko, equation (2). Equation (12) can then be rewritten as:

$$\frac{(V_s/V_d)_{min}, N}{(V_s/V_d)_{A\&P}, N_{max}} = 1 - \sqrt{1-N/N_{max}}$$

This function is shown in FIG. 6. It is apparent from this Figure that for a given electro-optical effect in which with multiplex drive $N_{max}$ rows can be used when using approximately 75% of this number of rows the required Vs/Vd ratio is halved relative to that required for multiplexing $N_{max}$ rows according to Alt & Pleshko. In practice a Vs/Vd ratio will preferably be selected which satisfies this ratio, in other words for which it holds that $$V_s/V_d \approx \sqrt{N_{max}}\left[1-\sqrt{1-N/N_{max}}\right]$$

What is claimed is:
1. A display device comprising two support plates spaced at a defined distance from each other and having surfaces facing each other between which a layer of liquid crystal material is provided, a pattern of N row electrodes being provided on one surface and a pattern of column electrodes being provided on the other surface, said row electrodes crossing the column electrodes so that the crossover regions form a matrix of display cells which can be switched from a first condition to a second condition optically different therefrom by means of a row-scanning circuit periodically scanning the row electrodes with a row selection pulse of the magnitude $V_s$, and a column-selection circuit applying data voltages of the magnitude $\pm V_d$ to the column electrodes during a period when a row electrode is scanned such that the optical condition produced in a display cell is determined by the RMS-voltage value across the relevant cell, said RMS-voltage value for the selected display cells, i.e. the display cells in the on-condition, being given by

$$V_1 = \left[ \frac{(V_s + V_d)^2}{N} + \frac{(N-1)}{N} V_d^2 \right]^{\frac{1}{2}}$$

and for the non-selected display cells, i.e. the display cells in the off-condition, being given by $$V_2 = \left[ \frac{(V_s - V_d)^2}{N} + \frac{(N-1)}{N} V_d^2 \right]^{\frac{1}{2}}$$

wherein the ratio V1/V2 in the transmission voltage characteristic curve of the optical effect associated with the liquid crystal material is of such a nature that not more then $N_{max}$ row electrodes can be used for a selected contrast ratio between selected and non-selected display cells in accordance with the Alt & Pleshko RMS multiplex drive mode, characterized in that for $N < N_{max}$ the voltage ratio Vs/Vd is defined by the relation:

$$\sqrt{N_{max}} \, [1 - \sqrt{1 - N/N_{max}}] \leq \frac{V_s}{V_d} < \sqrt{N}.$$

2. A display device as claimed in claim 1, characterized in that the ratio Vs/Vd is less than approximately $0.9 \sqrt{N}$.

3. A display device as claimed in claim 1, characterized in that the ratio Vs/Vd is equal to $$\sqrt{N_{max}} \, [1 - \sqrt{1 - N/N_{max}}].$$

* * * * *